United States Patent [19]

Cochran

[11] 3,720,820

[45] March 13, 1973

[54] CALCULATOR WITH A HIERARCHY CONTROL SYSTEM

[75] Inventor: Michael J. Cochran, Sunnyvale, Calif.

[73] Assignee: Tektranex, Inc., Beaverton, Oreg.

[22] Filed: March 18, 1971

[21] Appl. No.: 125,511

[52] U.S. Cl. ....................235/156

[51] Int. Cl. ....................G06f 7/38

[58] Field of Search ....................235/156, 159, 160, 164

[56] References Cited

UNITED STATES PATENTS

| | | | |
|---|---|---|---|
| 3,328,763 | 6/1967 | Rathbun et al. | 340/172.5 |
| 3,330,946 | 7/1967 | Sevitto | 235/160 |
| 3,469,244 | 9/1969 | Perotto et al. | 340/172.5 |
| 3,509,329 | 4/1970 | Wang et al. | 235/156 |
| 3,548,179 | 12/1970 | Kimura et al. | 235/156 |
| 3,614,404 | 10/1971 | Garfein | 235/159 |

*Primary Examiner*—Eugene G. Botz
*Assistant Examiner*—David H. Malzahn
*Attorney*—Adrian J. LaRue

[57] ABSTRACT

An electronic calculator in disclosed having a keyboard in which numbers and hierarchal mathematical instructions are entered to produce corresponding numerical and instruction signals to be operative to perform sequential calculations in accordance with mathematical rules of hierarchy. Instruction storage means are included with a plurality of storage sections, each storage section temporarily stores an instruction signal of a designated hierarchal level. Numerical storage means with a corresponding plurality of storage sections are also included to operate with the instruction storage means to temporarily store the numerical signals associated with the hierarchal mathematical instructions. A hierarchy control unit is provided to automatically transfer the contents of the instruction and numerical storage means to an arithmetic unit to enable sequential calculations to be performed in accordance with hierarchal rules of mathematics as each hierarchal instruction is entered in the calculator.

20 Claims, 15 Drawing Figures

INVENTOR.
MICHAEL J. COCHRAN

BY Robert Mednick

ATTORNEY

| | A | B | C | D |
|---|---|---|---|---|
| ADD | 1 | 0 | 0 | 1 |
| SUB. | 0 | 1 | 0 | 1 |
| MULT. | 1 | 0 | 1 | 0 |
| DIV. | 0 | 1 | 1 | 0 |
| $X^Y$ | 1 | 0 | 1 | 1 |
| $\sqrt{X^2+Y^2}$ | 0 | 1 | 1 | 1 |
FIG. 2
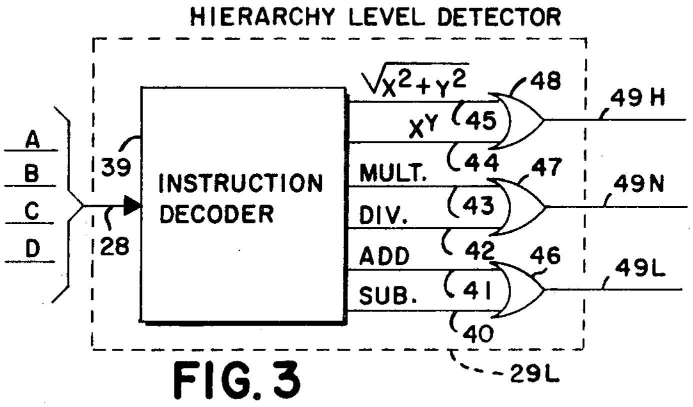
FIG. 3
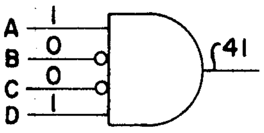
FIG. 4
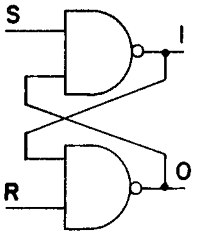
FIG. 5a
FIG. 6
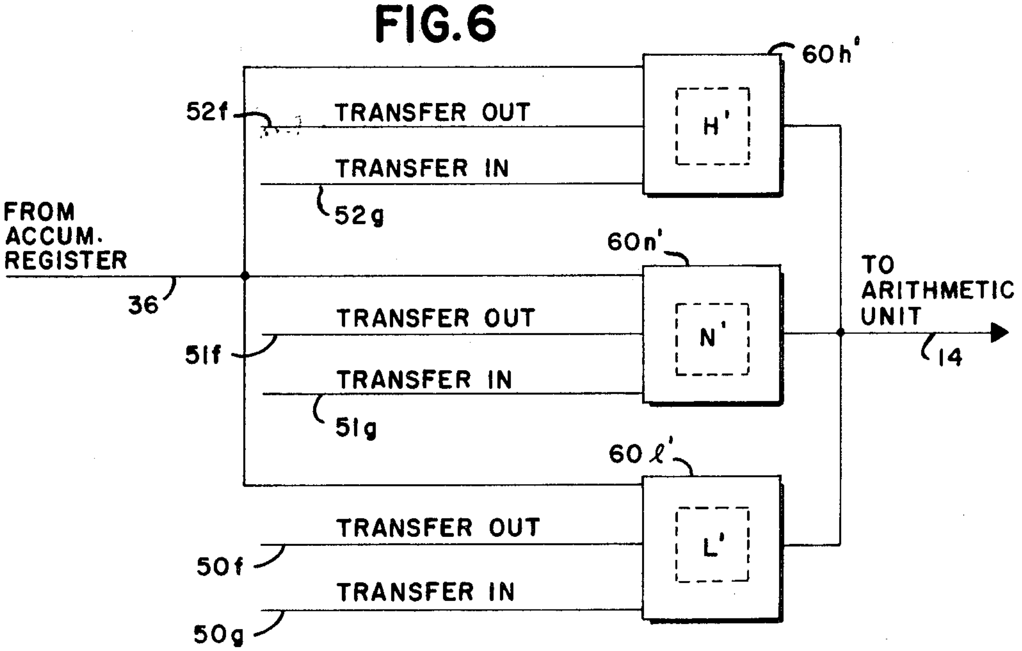
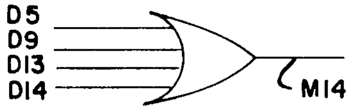
FIG. 9
INVENTOR
MICHAEL J. COCHRAN
BY Robert Mednick
ATTORNEY

INVENTOR.
MICHAEL J. COCHRAN

BY [signature]

ATTORNEY

INVENTOR.
MICHAEL J. COCHRAN

BY Robert Mednick

ATTORNEY

INPUT TO CONTROL MATRIX (columns) / OUTPUT OF CONTROL MATRIX (rows)

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| M 1 | | X | | | | | | | | | | | | | |
| M 2 | | | X | | | | | | | | | | | | |
| M 3 | | | | | | | X | | | | | | | | |
| M 4 | | | | | | | | | | | X | | | | |
| M 5 | | | | | X | | | | | | | | | | |
| M 6 | | | | | | | | | X | | | | | | |
| M 7 | | | | | | | | | | | | | X | | |
| M 8 | | | | X | | | | | | | | | | | |
| M 9 | | | | | | | | X | | | | | | | |
| M10 | | | | | | | | | | | | X | | | |
| M11 | | | | | | X | | | | | | | | | |
| M12 | | | | | | | | | | X | | | | | |
| M13 | | | | | | | | | | | | | | X | |
| M14 | | | | | | X | | | | X | | | | X | X |
| M15 | X | | | X | | | | X | | | | X | | | |
| M16 | | X | | | X | | | | X | | | | X | | |
| M17 | | | X | | X | | | | | | X | | X | | |
| M18 | | | | | | | X | | X | | X | | X | | |

FIG. 8

| ENTRY NO. | ENTRY REG. | ACC. REG. | NO. REG. L' | NO. REG. N' | NO. REG. H' | INST. REG. L | INST. REG. N | INST. REG. H |
|---|---|---|---|---|---|---|---|---|
| 1 | 6 | 6 | | | | | | |
| 2 | $\sqrt{X2+Y2}$ | 0 | | | 6 | | | $\sqrt{X2+Y2}$ |
| 3 | 8 | 8 | | | 6 | | | $\sqrt{X2+Y2}$ |
| 4 | ÷ | 0 | | 10 | | | ÷ | |
| 5 | 5 | 5 | | 10 | | | ÷ | |
| 6 | — | 0 | 2 | | | — | | |
| 7 | 1 | 1 | 2 | | | — | | |
| 8 | + | 0 | 1 | | | + | | |
| 9 | 4 | 4 | 1 | | | + | | |
| 10 | X | 0 | 1 | 4 | | + | X | |
| 11 | 3 | 3 | 1 | 4 | | + | X | |
| 12 | $X^Y$ | 0 | 1 | 4 | 3 | + | X | $X^Y$ |
| 13 | 2 | 2 | 1 | 4 | 3 | + | X | $X^Y$ |
| 14a | = | 9 | 1 | 4 | | + | X | |
| 14b | = | 36 | 1 | | | + | | |
| 14c | | 37 | | | | | | |

FIG. 11

INVENTOR
MICHAEL J. COCHRAN

BY Robert Mednick

ATTORNEY

CALCULATOR WITH A HIERARCHY CONTROL SYSTEM

A CALCULATOR WITH A HIERARCHY CONTROL SYSTEM

The present invention provides a calculator with a hierarchy control system which responds to numerical and hierarchal instruction entries to automatically perform sequential calculations in accordance with mathematical rules of hierarchy.

Electronic calculators are available that can perform many different mathematical operations on numbers. An operator by simply pushing buttons on a keyboard can enter into the calculator numbers and instructions for mathematical operations. If the sequence of entries do not affect the correct result, the calculator may be then operated in this simple manner. However, in using the calculator for polynomial mathematical expressions involving different mathematical operations, analysis and thought has to be given to the terms in the mathematical expression being considered. To obtain a correct result, the operator may cause entries in the calculator to be made in a sequence different from that stated in the mathematical expression. Furthermore, the calculator may have to be operated to calculate partial results of certain terms in the mathematical expression to be stored for later use. In doing so, the operator is required to be familiar with the procedures of the calculator to obtain partial results, transfer the partial results to storage, and later retrieve the partial results to continue with the desired calculations. Accordingly, the operator will have to be familiar with procedures in operating the calculator which are more complex than that of entering the numbers and instructions into the calculator by simply pushing buttons to make entries as indicated by the mathematical expression.

In accordance with the present invention, an electronic calculator is provided which is operative to automatically perform sequential calculations in accordancw with mathematical rules of hierarchy. A keyboard is utilized with buttons or keys that may be depressed or actuated to develop numerical and hierarchal instruction signals which are then stored in selected storage units designated for each hierarchal level of operation. In response to an entered hierarchal instruction, a hierarchy control unit automatically transfers those previously stored instructions and their associated numbers to the arithmetic unit to perform sequential calculations therewith. The storage units are then cleared to be able to receive subsequently entered instructions and numbers so that the calculations can continue in the desired sequence. As a result, the calculator in accordance with the present invention may be operated by simply pushing buttons or keys on the keyboard in accordance with the sequence of terms of the mathematical expression involved. The hierarchy control system of the calculator will thereupon automatically sequence the calculations to be made in the proper order so that the correct result contemplated by the mathematical expression is obtained.

It is therefore an object of this invention to provide a calculator with a hierarchy control system which responds to numerical and instruction entries to automatically perform sequential calculations in accordance with mathematical rules of hierarchy.

Another object of this invention is to provide a calculator with storage means for storing only a few entries, and yet being capable of performing calculations of a polynomial mathematical expression requiring any number of entries to be made into the calculator. Still still another object of this invention is to provide a calculator for performing calculations of a polynomial mathematical expression which may be operated by simply making numerical and instruction entries as indicated by the sequence of terms in the mathematical expression.

A further object of this invention is to provide an electronic calculator in which its operation in making hierarchal calculations is compatible with its operation in making non-hierarchal calculations.

A still further object of this invention is to provide an electronic calculator which can calculate many different and complex mathematical expressions without different procedures required by an operator in making or handling entries and thereby reducing the possibilities of operational errors.

Another object of this invention is to provide a calculator with a hierarchy control system which is low in cost and of simplicity in design.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

FIG. 2 is a chart showing the binary signals representing hierarchal instructions that are developed in the entry register shown in FIG. 1.

FIG. 3 is a more detailed diagram of the hierarchy level detector shown in FIG. 1.

FIG. 4 is a logic diagram of an AND circuit illustrating the operation of the instruction decoder in the hierarchy level detector shown in FIG. 3.

Figure 5:
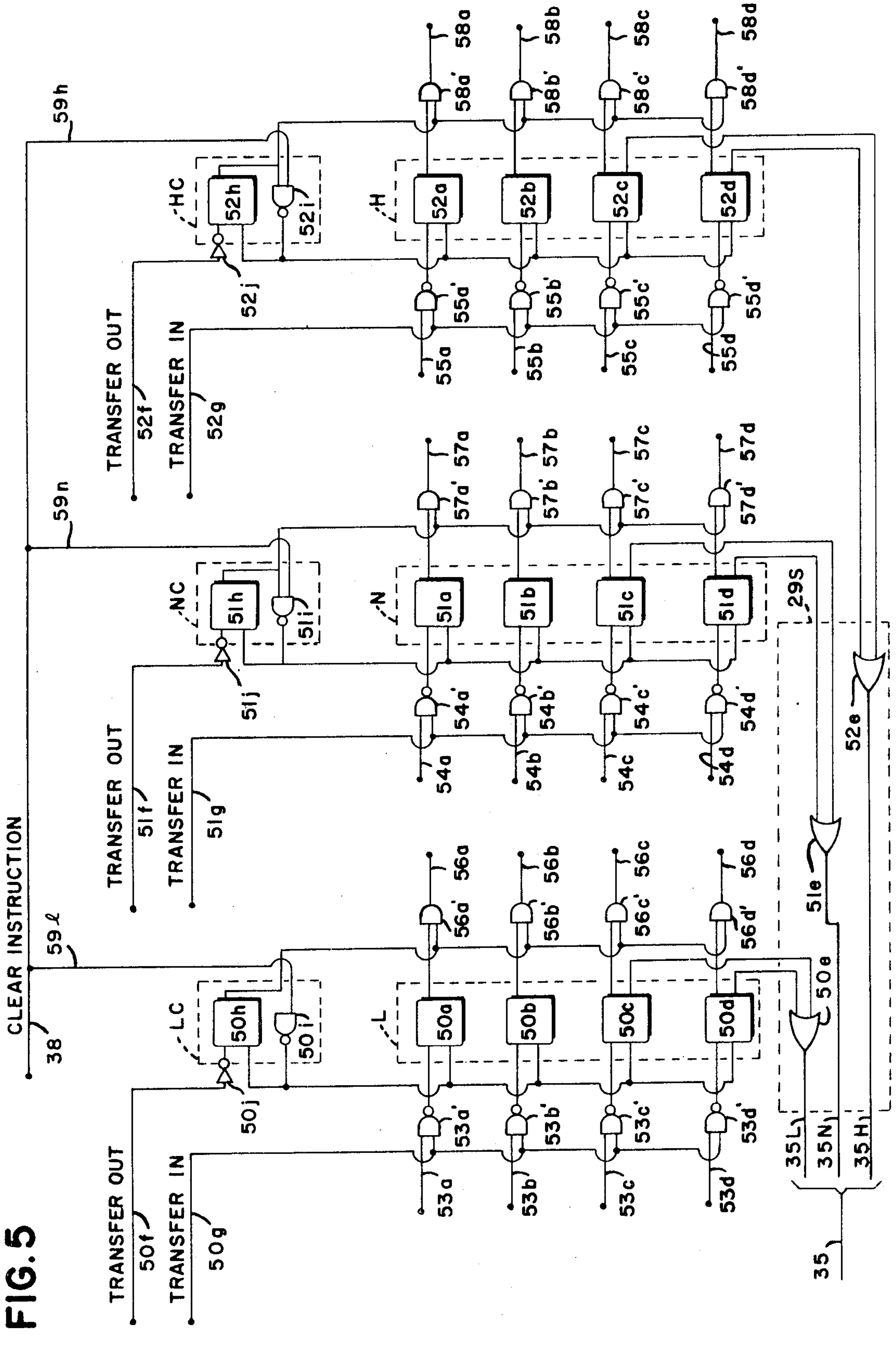
FIG. 5 is a detailed symbolic diagram of the instruction storage unit and sensing unit seen in FIG. 1, said instruction storage unit is shown to have three storage sections therein.

FIG. 5*a* is a logic diagram of a typical latch circuit utilized in the diagram of FIG. 5.

Figure 1:
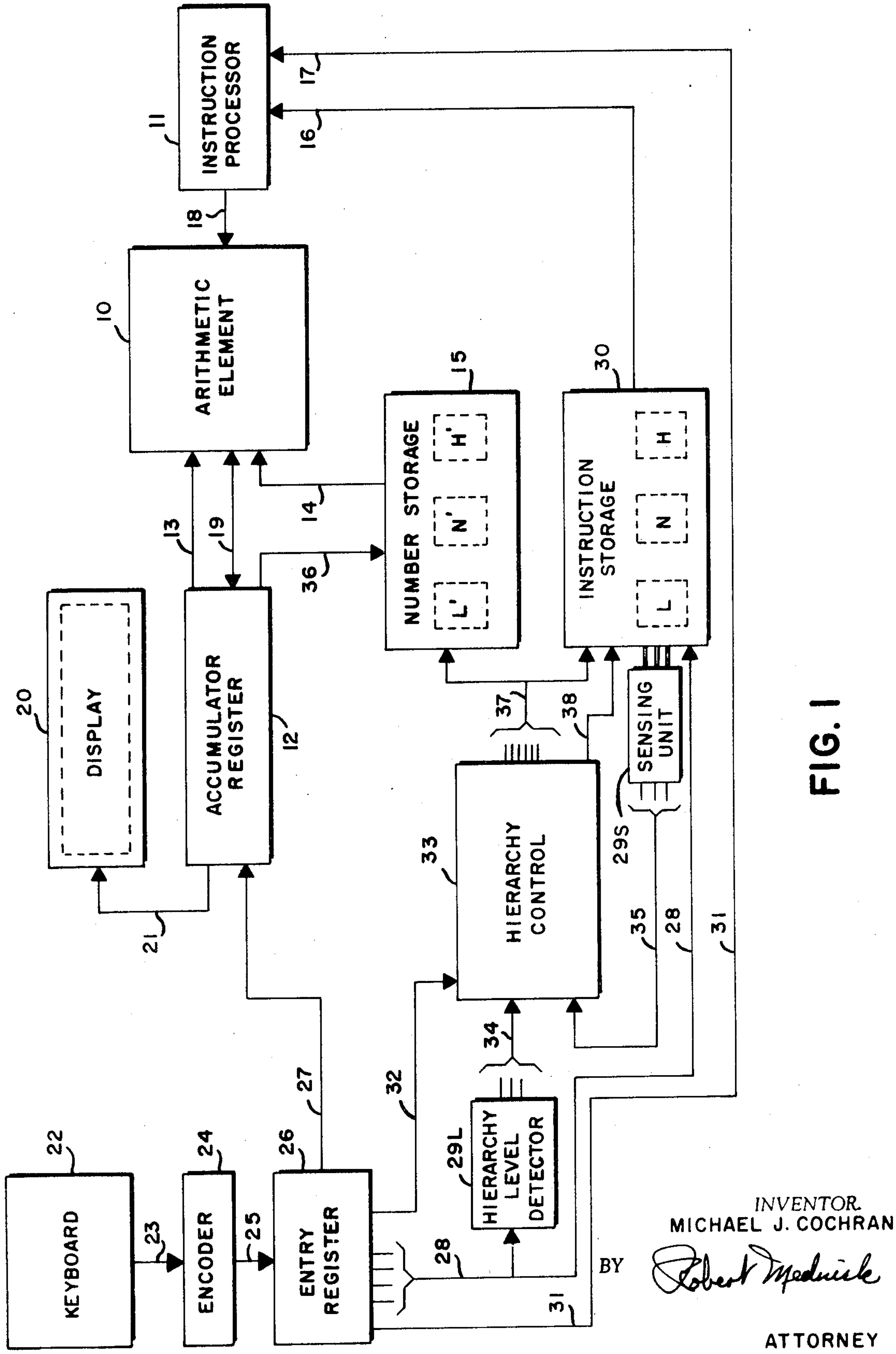
FIG. 1 is a simplified block diagram showing the principal units of the calculator with a hierarchy control system in accordance with the present invention.

FIG. 6 is a block diagram of the number storage unit shown in FIG. 1 for temporarily storing the number signals associated with the hierarchal instruction signals stored in the instruction storage unit.

Figure 7:
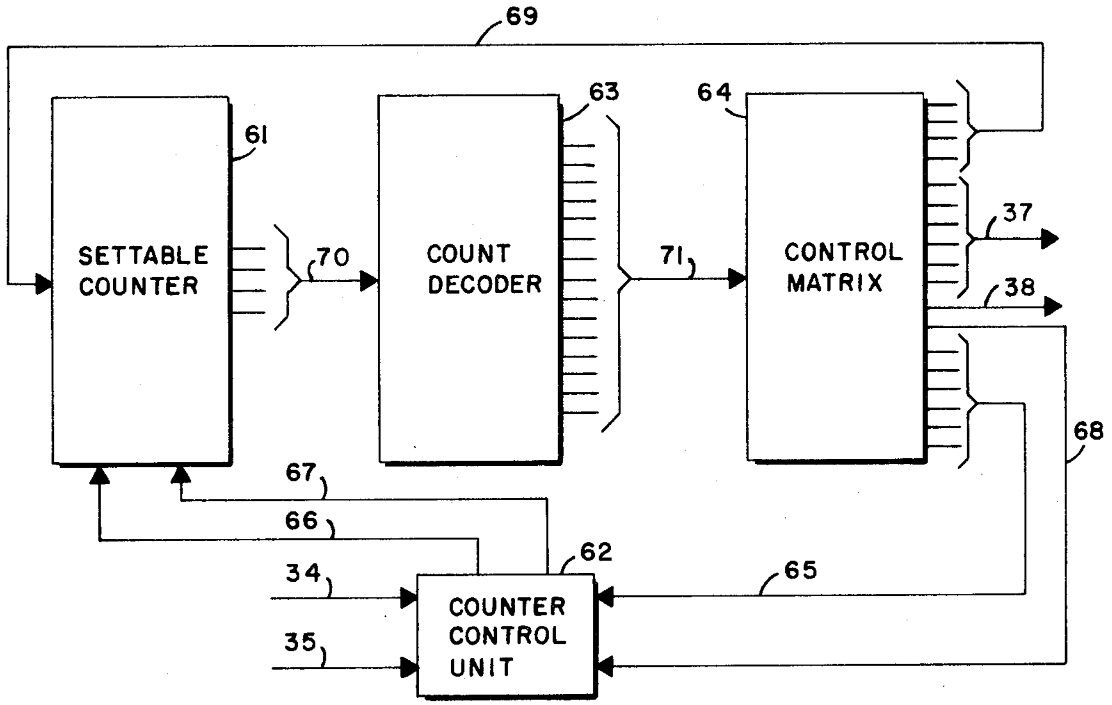

FIG. 7 is a detailed block diagram of the hierarchy control unit shown in FIG. 1.

Figure 7C:
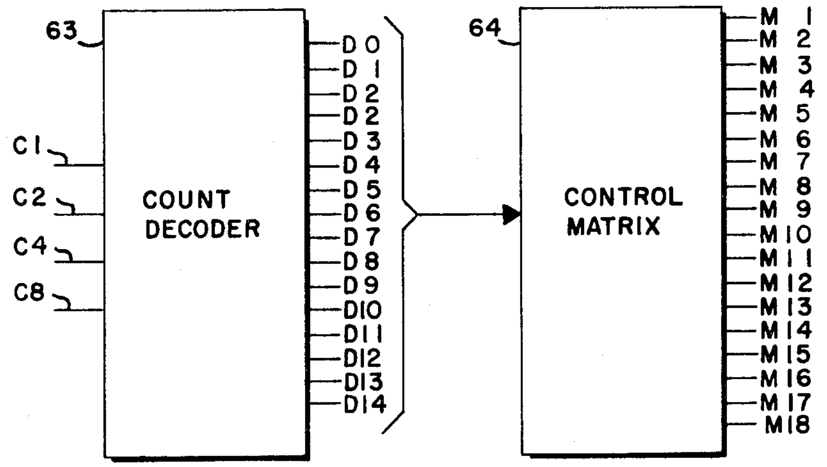
Figure 7B:
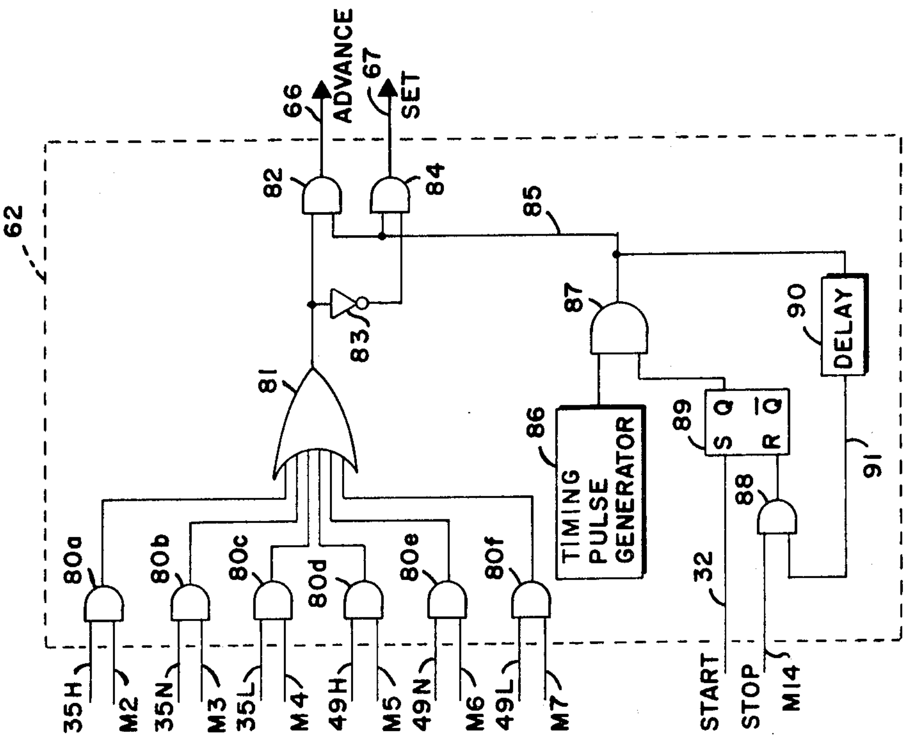
Figure 7A:
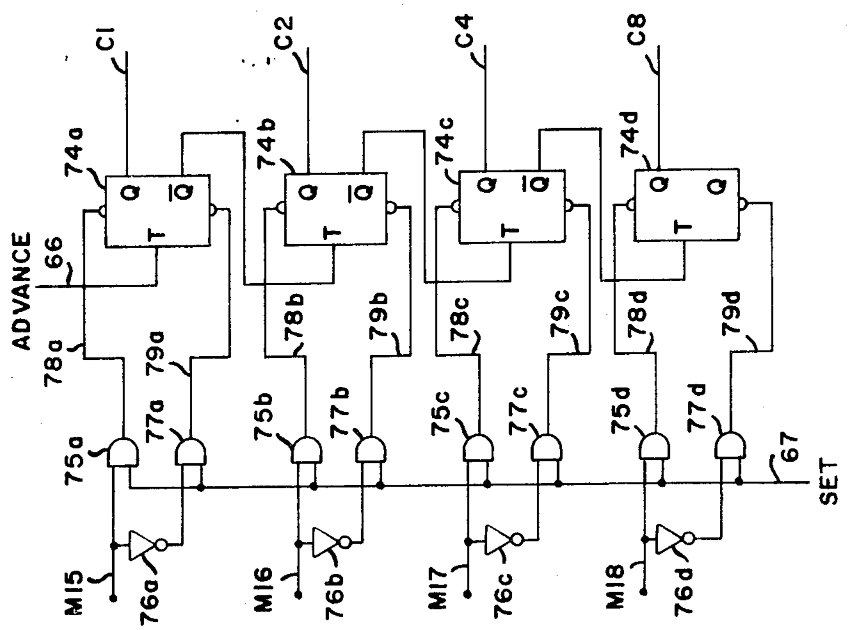

FIG. 7*a* is a more detailed diagram of the settable counter in the hierarchy control unit shown in FIG. 7.

FIG. 7*b* is a more detailed diagram of the counter control unit in the hierarchy control unit shown in FIG. 7.

FIG. 7*c* shows the counter decoder and the control matrix in the hierarchy control unit seen in FIG. 7.

FIG. 8 is a chart showing the output response of the control matrix of FIG. 7*c* to all input count signals developed by the count decoder.

FIG. 9 is a logic diagram of an OR circuit illustrating the operation of the count decoder and control matrix of FIG. 7*c*.

Figure 10:
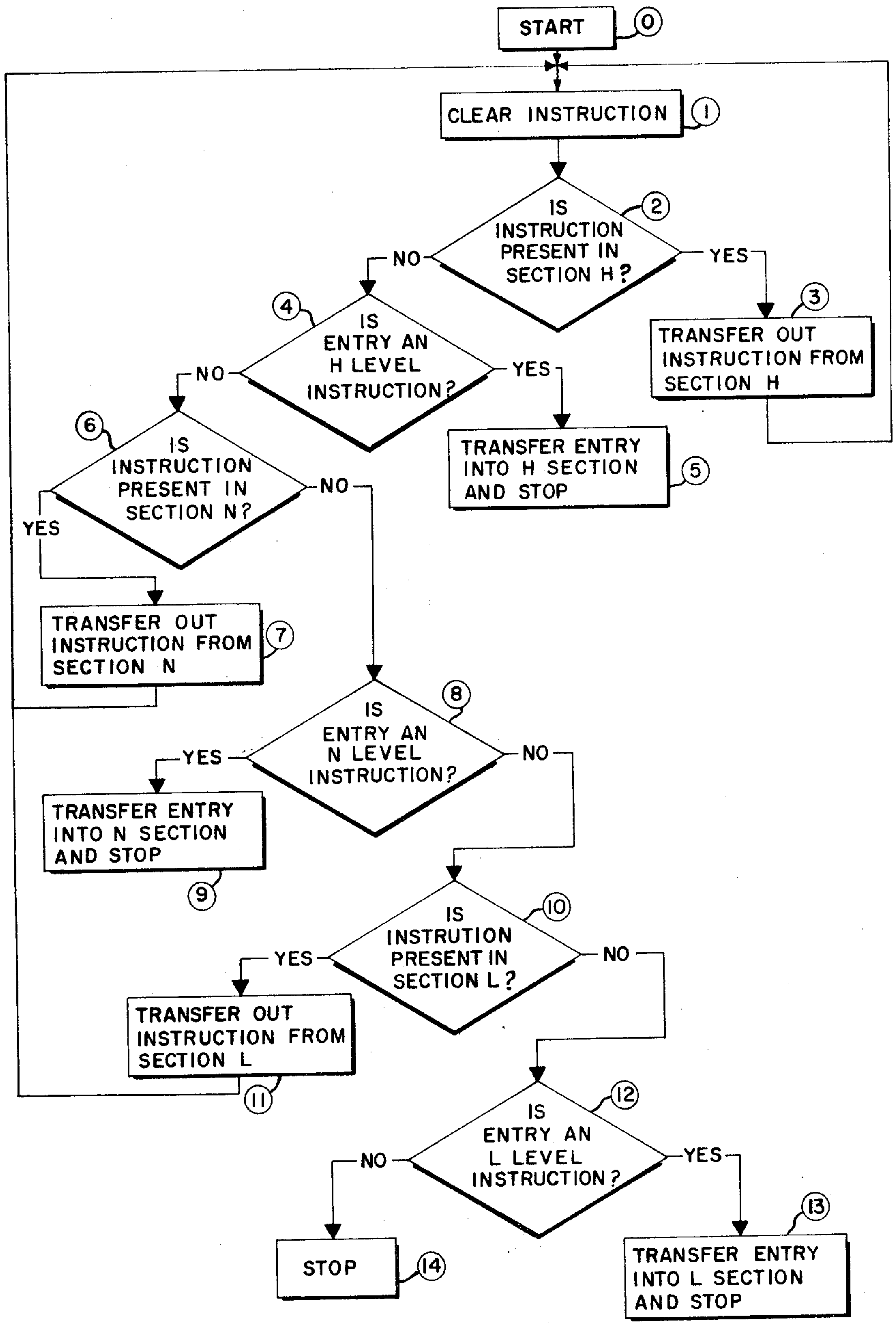

FIG. 10 is a flow diagram illustrating the operation of the hierarchy control system of this invention.

FIG. 11 is a chart indicating the location of the number and hierarchy instruction signals in the units of the calculator as each entry is made in the keyboard of the calculator in accordance with one example of operation.

It is to be noted that certain mathematical operations are a function of two numbers. The mathematical operations of addition, subtraction, multiplication, division, exponentiation, and the square root of the sum of the squares, are examples of such mathematical operations. In order to properly calculate a mathematical expression involving such mathematical operations, the mathematical rules of priority of calculations should be observed. The calculator instructions for these mathematical operations are herein called hierarchal instructions. Other mathematical operations are a function of a single numerical value. For example, the trigonometric function of the sine of an angle involves the calculation on a single number representing the angle. Other trigonometric functions as well as hyperbolic functions are additional examples of mathematical operations which are a function of a single numerical value. The calculator instructions for these mathematical operations are herein called non-hierarchal instructions.

Referring now to FIG. 1, there is shown therein a functional block diagram of a calculator with a hierarchy control system in accordance with the present invention which illustrates the processing of the entries made in the calculator. The calculator includes an arithmetic unit comprising an arithmetic element 10, an instruction processor 11, and an accumulator register 12. Arithmetic element 10 is the part of the arithmetic unit that performs the arithmetic operations. Arithmetic element 10 performs its arithmetic operations on numbers applied thereto on line 13 from accumulator register 12 and on line 14 from number storage unit 15. Instruction processor 11 receives mathematical instruction signals in binary form on lines 16 and 17 to supply a series of sub-instruction signals on line 18 to arithmetic element 10 to enable it to carry out the mathematical instructions. The results of the calculations performed by arithmetic element 10 are transferred on line 19 to accumulator register 12 to be temporarily stored therein. Display unit 20 is connected to accumulator register 12 by line 21 to read out and display the numbers stored in accumulator register 12.

A keyboard 22 is provided having keys that are actuated to make entries to be utilized in the calculator. Keyboard 22 has number keys, mathematical instruction keys (i.e. for both hierarchy and non-hierarchy type of instructions), and a total or equal (=) key. The keys in keyboard 22 are operated by being sequentially depressed and released in order to supply signals on line 23 to enable encoder 24 to produce corresponding binary signals on line 25 to be temporarily stored in entry register 26. The entry unit for the calculator includes keyboard 22, encoder 24, and entry register 26. Actuation of the number keys in keyboard 22 will cause binary signals to be produced in entry register 26 representing the decimal digit numbers from "0" to "9."The number signals in entry register 26 are transferred to accumulator register 12 as indicated by line 27. Actuation of the mathematical instruction keys in keyboard 22 will cause binary signals to be temporarily stored in entry register 26 which can enable the arithmetic unit to carry out the mathematical operation involved. The hierarchal instruction signals developed in entry register 26 are applied by line 28 to hierarchy level detector 29L and to instruction storage unit 30. The non-hierarchal instruction signals are applied by line 31 to instruction processor 11. In addition, every time either a hierarchy instruction key is actuated, a start pulse is also developed in entry register 26 which is applied by line 32 to hierarchy control unit 33.

Keyboard 22, encoder 24, entry register 26, arithmetic element 10, instruction processor 11, accumulator register 12, and display unit 20 represent calculator components that may be similar in construction and design to those in conventional electronic calculators.

Hierarchy level detector 29L receives the hierarchal instruction signals on line 28 to develop hierarchal level signals on line 34 applied to hierarchy control unit 33. Instruction storage unit 30 is seen to include three storage sections L, N, and H for storing hierarchal instruction signals corresponding to the three hierarchal level signals present on line 34. The letters L, N, and H indicate lowest, next lowest, and highest orders of priority of operation, respectively. Sensing unit 29S is connected to instruction storage unit 30, and provides sensing signals indicative of the instruction signals stored in sections L, N, and H. These sensing signals are applied to hierarchy control unit 33 by line 35. Number storage unit 15 includes three storage sections L′, N′, and H′ for storing numbers received on line 36 from accumulator register 12. The numbers stored in sections L′, N′, and H′ are those associated with the instructions stored in the sections of the instruction storage unit 30 bearing the same letter. Upon receiving a start pulse on line 32, hierarchy control unit 33 will initiate its operation and provide "transfer in" signals and transfer out" signals on line 37 applied to both number storage unit 15 and instruction storage unit 30. Hierarchy control unit 33 will also provide a clear instruction signal on line 38 to instruction storage unit 30. Hierarchy control unit 33 will stop its operation when the hierarchy instruction signal in entry register 26 is transferred to a section in instruction storage unit 30, until started again by another start pulse received on line 32.

In order to illustrate the operation of the calculator with the hierarchy control system of this invention, there is shown in FIG. 2 a chart of binary signals that may be developed in entry register 26 to represent entered hierarchal instructions upon actuation hierarchy instruction keys. The letters A, B, C, and D refer to the four outputs of entry register 26 which are applied to hierarchy level detector 29L and to instruction storage unit 30 by line 28. The instruction identifying column therein shows ADD for addition, SUB for subtraction, MULT for multiplication, DIV for division, $X^y$ for exponentiation (where the absolute value of a number is raised to a power), and finally the conventional mathematical symbol for the square root of the sum of the squares. In the rows identified by these instructions, the numbers "1" and "0" indicate the existence of a high and low voltage level, respectively, on output lines A, B, C, and D for each of these hierarchal instructions. For example, after an ADD instruction key is actuated, the chart of FIG. 2 shows that a high voltage level will be present on lines A and D, and that a low voltage level will be present on lines B and C.

Referring now to FIG. 3, there is seen therein a more detailed diagram of the hierarchy level detector 29L shown in FIG. 1. The four bit binary signals on lines A, B, C, and D from entry register 26 on line 28 are applied to instruction decoder 39. Lines A, B, C, and D connect to flip-flops or the like forming binary storage elements in entry register 26. In turn, instruction decoder 39 converts each of the combination of binary input signals into a single high voltage signal on its output lines 40 to 45. For the six hierarchal instruction signals shown in FIG. 2, instruction decoder may be made of diodes forming six AND gates, with the outputs thereof being on lines 40 to 45. Each AND gate will have four inputs connected to the binary storage elements in entry register 26. For example, FIG. 4 shows such an AND gate for the addition instruction. The low voltage levels of the addition instruction signal of FIG. 2 present on lines B and C in FIG. 4 are seen to be inverted to apply high voltage levels as inputs to the AND gate. It will be realized that inverted voltage levels may be obtained from flip-flop circuits without the need of inverter circuits.

It will be noted that the mathematical operations included in mathematical expressions may have different hierarchal levels requiring different priorities in the order of their calculations. However, those mathematical operations which are of the same hierarchal level may be performed in any desired order. The mathematical operations of addition and subtraction are equal to each other as far as priority of operation is concerned; the mathematical operations of multiplication and division are equal to each other as far as priority of operation is concerned, but are of a higher order of priority than those previously stated; and the mathematical operations of exponentiation and the square root of the sum of the squares are equal to each other as far as priority of operation is concerned, but are of the highest order of priority than any of the others. For these six indicated mathematical operations, three hierarchal levels are involved.

Accordingly, the outputs of instruction decoder 39 which are of the same hierarchal level are applied to an OR gate to produce a single high voltage output indicating the existence of an hierarchal instruction signal of one of these three levels of priority. As seen in FIG. 3, lines 40 and 41 are applied to OR gate 46 with its output on line 49L representing the existence of an "L" type of instruction, lines 42 and 43 are applied to OR gate 47 with its output on line 49N representing the existence of an "N" type of instruction, and lines 44 and 45 are applied to OR gate 48 with its output on line 49H representing the existence of an "H" type of instruction. For each four bit signal present in input lines A, B, C, and D from entry register 26, hierarchy level detector 29L will develop a single high level signal on one of its output lines 49L, 49N, and 49H. As a result, hierarchy level detector 29L develops hierarchy level signals indicating designated hierarchy levels of each hierarchal mathematical instruction entered into the calculator.

Referring now to FIG. 5, there is shown therein a detailed symbolic diagram of instruction storage unit 30 with three storage sections for hierarchal instruction signals having four binary bits transferred in parallel from entry register 26. Section L includes four latch circuits 50*a* through 50*d*, section N includes four latch circuits 51*a* through 51*d*, and section H includes four latch circuits 52*a* through 52*d*. One of these latch circuits is shown in FIG. 5*a* in conventional logic form as a pair of NAND gates wherein the outputs of each is applied to an input to the other. A low level voltage applied to the upper input S will set the latch, i.e. cause a high level voltage to be present at its upper output line 1, if not already in that condition. A low level voltage applied to the lower input R will reset or clear the latch, i.e. cause a high level voltage to be present at its lower output line 0, if not already in that condition.

Input lines 53*a* to 53*d* to section L, input lines 54*a* to 54*d* to section N, and input lines 55*a* to 55*d* to section H are connected in parallel to each other, and are connected to the outputs A, B, C, and D, respectively, of entry register 26 as represented by reference line 28. Output lines 56*a* to 56*d* from section L, output lines 57*a* to 57*d* from section N, and output lines 58*a* to 58*d* from section H are connected in parallel to each other, and are connected to instruction processor 11 via line 16. Reference line 37 from hierarchy control unit 33 includes transfer out lines 50*f*, 51*f*, and 52*f*, and transfer in lines 50*g*, 51*g*, and 52*g*, which are separately connected to instruction storage unit 30. Line 38 from hierarchy control unit 33 connects to clear instruction lines 59*l*, 59*n*, and 59*h*.

When a transfer out signal for one of the sections L, N, or H is produced by hierarchy control unit 33, it will be applied through inverters 50*j*, 51*j*, or 52*j* to one of set inputs of the control latches 50*h*, 51*h*, or 52*h* in control elements LC, NC or HC. Typically, if a high voltage level transfer out signal for section L is produced, inverter 50*j* will cause a low level voltage to be applied to the set input of control latch 50*h*. With control latch 50*h* set, the high level output thereof will enable control gate 50*i* and also enable output gates 56*a*' to 56*d*'. As a result, the instruction signal stored latch L will be transferred out on output lines 56*a* through 56*d*. Thereafter, when a clear signal is produced by hierarchy control unit 33, NAND gate 50*i* being enabled with produce a low level reset signal to reset control latch LC and clear latch circuits 50*a* through 50*d*. When a high level transfer in signal is then applied to line 50*g*, gates 53*a*' through 53*d*' will be enabled to allow the instruction signal in entry register 26 to be transferred to the latch circuits in section L. Similarly, the same transfer and storage operations are performed in sections N and H if such signals are applied to these sections.

FIG. 5 also shows sensing unit 29*s* which has three OR gates 50*e*, 51*e*, and 52*e*. Each of OR gates 50*e*, 51*e*, and 52*e* have inputs connected to two of the lower outputs of the latch circuits of sections L, N, and H respectively. The outputs of OR gates 50*e*, 51*e*, and 52*e* on lines 35L, 35N, and 35H respectively, are the sensing signals representing the presence or absence of a stored instruction signal in each of the sections. The outputs of sensing unit 29*s* are separately applied to hierarchy control unit 33.

Referring now to FIG. 6, there is shown a block diagram of number storage unit 15 for temporarily storing the number signals associated with the instruction signals stored in instruction storage unit 30. Number storage unit 15 includes three storage sections designated as H', N', and L' to indicate that these sections are associated with those sections having the same letter in instruction storage unit 30. In response to a transfer in control signal received on reference line 37 from hierarchy control unit 33, number storage unit 15 will receive via line 36 the number signal present in accumulator register 12 and store this number signal in one of its sections L', N' or H'. Section L' thereof will store the number signal present in accumulator register 12 when an instruction signal is stored in section L of instruction storage unit 30, section N' thereof will store the number signal in accumulator register 12 when when an instruction signal is entered in section N of instruction storage unit 30, and section H' thereof will store the number signal present in accumulator register 12 when an instruction signal in entered in section H of instruction storage unit 30. Sub-units 60*h'*, *60n'*, *and 60l'* include storage sections L', N', and H', as well as associated gates and control elements similar to that described in FIG. 5 for enabling number signals to be transferred in and out of these storage sections. The number signals in accumulator register 12 are applied via reference line 36 to sub-units 60*h'*, 60 *n'*, and 60*l'* and are transferred out by reference line 14 to the arithmetic unit. The same transfer in and transfer out lines connected to the instruction storage unit described in FIG. 5 are connected to sub-units 60*h'*, 60*n'*, and 60*l'*. Storage sections L', N', and H' are register that include storage elements sufficient to store all the several numerical digit signals that may be consecutively entered in accumulator register 12.

Referring now to FIG. 7, there is shown a block diagram of a hierarchy control unit 33 which includes a settable counter 61, a counter control unit 62, a count decoder 63, and a control matrix 64. Hierarchal level signals on line 34 from hierarchy level detector 29L are applied to counter control unit 62. Sensing signals on line 35 from sensing unit 29S are also applied to counter control unit 62. Several enabling signals from control matrix 64 are applied to counter control unit 62 as indicated by line 65. In response to these applied signals, counter control unit 62 produces either an advance signal or a set signal applied to settable counter 61 by lines 66 and 67 respectively. A stop signal produced by control matrix 64 on lone 68 is also applied to counter control unit 62. Settable counter 61 also receives counter control signals on line 69 from control matrix 64. Settable counter 61 produces a four bit binary signal on its output on line 70 indicating the count therein. In response thereto, count decoder 63 produces output signals on line 71 to be applied to control matrix 64. Count decoder 63 and control matrix 64 form a control signal distributor for the hierarchy control unit 33. In response to the signals on line 71, control matrix 64 produces counter control signals on line 69, enabling signals on line 65, transfer in and transfer out signals on line 37, clear signals on line 38, and stop signals on line 68.

FIG. 7*a* shows a detailed diagram of settable counter 61 of FIG. 7 which is seen to include four successive flip-flops 74*a*, 74*b*, 74*c*, and 74*d* connected to form a counter. The Q outputs of these flip-flops are connected to terminals C1, C2, C4, and C8 with the number portion thereof designating the binary count or weight thereof. Except for flip-flop 74*a*, the trigger or complementing inputs T of these flop-flops are taken from the $\bar{Q}$ outputs of the preceding flip-flops for a count up operation. The trigger inputs to flip-flop 74*a* is connected to advance line 66. Accordingly, for each timing pulse existing on advance line 66, the binary counter formed by flip-flops 74*a* to 74*d* will advance its binary count by one.

Each of flip-flops 74*a* to 74*d* also has a direct set and a direct clear input to enable them to be separately set or cleared. Counter control line M15 from control matrix 64 connects to one input of AND gate 75*a* and through an inverter 76*a* to one input of AND gate 77*a*; the outputs 78*a* and 79*a* of AND gates 75*a* and 77*a* connect to the direct set and direct clear inputs of flip-flop 74*a*. Counter control line M16 from control matrix 64 connects to one input of AND gate 75*b;* the outputs 78*a* and 79*b* of AND gates 75*b* and 76*b* connect to the direct set and direct clear inputs of flip-flop 74*b*. Counter control lines M17 and M18 are similarly connected to flop-flops 74*c* and 74*d* respectively. When a high voltage level exists on set line 67, each of the flip-flops 74*a* to 74*d* will be caused to be set or cleared depending upon whether or not a high voltage level is present on lines M15, M16, M17, and M18. Accordingly, the count on output terminals C1, C2, C4, and C8 will be advanced by one each time a timing pulse is applied to advance line 66, or alternatly the count will be changed to correspond to the input count on counter control lines M15 to M18 each time a timing pulse is applied to set line 67.

Referring now to FIG. 7*b*, there is shown therein a logic diagram of the counter control unit 62 seen in FIG. 7. Counter control unit 62 includes six AND gates 80*a*, 80*b*, 80*c*, 80*d*, 80*e*, and 80*f* having outputs connected to OR gate 81. Counter control signals on lines M2 through M7 from control matrix 64 are applied as one input to each of AND gates 80*a* to 80*f* respectively. Sensing signals from sensing unit 29*s* on lines 35H, 35N, and 35L are applied as one input to each of AND gates 80*a*, 80*b*, and 80*c*, respectively. Hierarchy level signals from hierarchy level detector 29L on lines 49H, 49N, and 49L are applied as one input to each of AND gates 8*od*, 80*e*, and 80*f*, respectively. The output of OR gate 81 is connected as one input to advance AND gate 82, and through an inverter 83 as one input to set AND gate 84. The other inputs to both AND gates 82 and 84 are supplied by line 85.

Counter control unit 62 is also seen to include a timing pulse generator 86, two AND gates 87 and 88, a flip-flop 89, and a delay circuit 90. Timing pulse generator 86 may be an astable multivibrator for producing a continuous sequence of timing pulses on line 85 when gate 87 is enabled by the Q output of flip-flop 89. A start pulse signal on input line 32 sets flip-flop 89 to enable AND gate 87. A stop signal on line M14 together with a high voltage signal on line 91 will reset flipeflop 89 to disable AND gate 87. The output of AND gate 87 is shown to be applied to stop AND gate 88 through delay circuit 90 to provide a short delay to indicate one way of overcoming a possible race problem when a stop signal is present on line M14 to reset flip-flop 89. Timing pulse generator 86 is designed so that each timing pulse produced therefrom has a duration to allow arithmetic element 10 to perform the calculation of the mathematical instructions. Accordingly, it will be realized, that after a start signal on line 32 sets flip-flop 87, AND gate 87 will enable the timing pulse signals to be applied to either advance line 66 or to set line 67 depending upon whether a high voltage signal is or is not present on the output of OR gate 81. On the other hand, when a stop signal is present on line M14, flip-flop 89 will be reset to disable AND gate 87 thereby preventing the timing pulses from being applied to advance or set lines 66 and 67.

As seen in FIG. 7*c*, the lines C1, C2, C4, and C8 from settable counter 61 provide the inputs to count decoder 63. The outputs lines of count decoder 63 are consecutively numbered from D0 to D14 with the number portion thereof representing the count on lines C1, C2, C4, and C8 developed in settable counter 61. Count decoder 63 may include diodes forming AND circuits similar to that shown in FIG. 4. Lines D0 to D14 are applied to control matrix 64 which has output lines shown to be consecutively numbered from M1 through M18. FIG. 8 is a chart indicating by cross marks the existence of high output voltage levels of output lines M1 through M18 for each high level input signal on lines D0 through D18. Control matrix 64 may comprise diodes forming OR circuits arranged in a matrix in conventional form to produce combination of output high voltage levels as indicated in the chart of FIG. 8. For example, lines D5, D9, D13, and D14 may be connected by one OR circuit to form a high level voltage on its output being line M14 whenever any one of these counts is present. FIG. 9 is a simple logic diagram illustrating such a circuit and typifying the formation of control matrix 64.

Now, the operation of the hierarchy control system during a single cycle of operation will be considered, i.e. from the time when a start pulse is produce don line 32 until the time that the hierarchy control system thereafter stops operating. The flow diagram of FIG. 10 illustrates the operation of the hierarchy control system during any single cycle of operation. In this flow diagram, the encircled numbers for the quadrilateral symbols indicate the then existing count outputs of settable counter 61. In considering this operation, reference will also be made to the lines interconnecting the hierarch control system of FIG. 7 and its components in FIGS. 7*a*, 7*b*, and 7*c*, and to the chart of FIG. 8.

As digital voltage levels exist on the various described inputs, outputs, or lines connected to the several components, and as these voltage levels are of two states, they will be referred to as "high" or "low" indicating that either a high or low voltage state or level exists.

First, it will be assumed that the hierarchy control system is initially not operating. Upon the entry of a hierarchal instruction signal in entry register 26, a start pulse is applied by line 32 to the set input of flip-flop 89 causing its Q output to enable AND gate 87. The next timing pulse produced by timing pulse generator 86 will cause set line 67 to be high. The high voltage on M15 will directly set flip-flop 74*a*, and the other flip-flops 74*b* to 74*d* will be directly cleared thereby setting the count output of settable counter 61 to "1."

With the output of settable counter 61 at "1," M1 and M16 are now high. M1 being high and connected to the clear instruction line 38 as seen in FIG. 5 will enable a prior transferred out hierarchy instruction signal to be cleared from its storage section as previously described. With M16 being high, when the next timing pulse is produced on line 85, set line 67 will go high to cause flip-flop 74*b* of settable counter 61 to be directly set (the other flip-flops receiving a direct clear signal) to cause the output of settable counter 61 to read "2."

With the output of settable counter 61 at "2," M2 and M17 are now high. If only M2 is high, the output of OR gate 81 will not be high. As M17 is high, when the next timing pulse is produced on line 85, set line 67 will be high to change the output of settable counter 61 to read "4." On the other hand, if a high level sensing signal on 35H exists indicating an instruction signal is stored in section H of instruction storage unit 30, with M2 being high, the output of OR gate 81 will be high. If so, the next timing pulse will cause advance line 66 to go high to increment the count of settable counter 61 to read "3."

With the output of settable counter at "3," M8 and M15 are high. M8 is applied to line 52*f* as the transfer out signal and will enable the H hierarchal instruction signal sensed to be present on line 35H to be transferred out as previously described. Also, with M15 being high, when the next timing pulse is produced set line 67 will go high to cause the output of settable counter 61 to read "1." Now during the next two timing pulses, settable counter 61 will proceed as before to count "2" at which time the output of OR gate 81 will not be high. Then when the next timing pulse is produced, set line 67 will be high to change the output of settable counter 61 to read "4."

With the output of settable counter at "4," M5, M16, and M17 are high. If a high level voltage exists on line 49H, then with M5 applied to AND gate 80*d*, the output of OR gate 81 will go high. If so, the next timing pulse will cause advance line 66 to go high to increment the count of settable counter to "5."

With the output of settable counter at "5," M11 and M14 are high. M11 is applied to line 52*g* to enable the H hierarchal instruction signal in entry register 26 to be stored in section H as previously described. Upon the arrival on the next timing pulse, set line 67 will go high to reset settable counter to "0." Then, with M14 being high, start-stop flip-flop 89 will be reset to disable AND gate 87 to stop further timing pulses from being applied to settable counter 61 until flip-flop 89 is again set. Flip-flop 89 will be set by another start pulse on start line 32.

Referring back to condition of the output of settable counter 61 being at the count of "4," if an H level signal is not present in entry register 26, the output of OR gate 81 will be low. Then, as M16 and M17 are high, the next timing pulse will cause set line 67 to go high to cause the output of settable counter 61 to read "6."

When the output of settable counter 61 is at "6," the operation of the huerarchy control system is similar to that described when the output of settable counter 61 was at "2." The presence of a high sensing signal on line 35N will cause advance line 66 to go high to increment the count of settable counter 61 to "7." The N instruction signal in section N will be transferred out by the high M9 signal applied to transfer out line 51*f*. Also set line 67 will go high to cause the output of settable counter 61 to thereafter read "1" and proceed again as previously described. If a sensing signal is not present on line 35N, then at the next timing pulse, set line 67 will be high to change the output of settable counter 61 to read "8."

When the output of settable counter 61 is at "8, " the operation of the hierarchy control system is similar to that described when the output of settable counter 61 was at "4. " The presence of an N level instruction signal in entry register 26 will cause the count of settable counter 61 to be incremented to "9." With settable counter at "9," M12 is high and is applied to line 51*g* in instruction storage unit 30 to enable the hierarchal instruction signal in entry register 26 to be stored in section N. At the next timing pulse, settable counter 61 will be reset to "0," and AND gate 88 will also be disabled by M14 being high to stop further timing pulses from being applied to settable counter 61 until flip-flop 89 is thereafter set. However, if an N level instruction signal is not present in entry register 26, then with M16 being high, the output of settable counter 61 will change to "10."

When the outputs of settable counter 61 are at 10, 11, and 12, the operation of the hierarchy control system is similar to that previously described. If an instruction signal is present in section L, it will be transferred out; then if an L level instruction signal is present in entry register 26, it will be transferred into section L, and the hierarchy control system will then stop. If an instruction signal is not present in section L, the hierarchy control system will stop. Accordingly, during a cycle of operation for any hierarchal instruction signal entered in entry register 26, transfers are sequentially made in a predetermined order upon the conditions stated as indicated in the flow diagram of FIG. 10. The predetermined order herein is selected so that the resultant calculations abide with the mathematical rules of hierarchy.

It will now be further realized, that as actuation of the total or equal key produces a start pulse on line 32, the hierarchy control system will then operate to clear all stored instructions and numbers in instruction storage unit 30 and number storage unit 15. As neither an H, N, or L level instruction signal will then be present in entry register 26, settable counter 61 will change to "4" from count "2" to "10" from count "8," and to "14" from count "12." After all entries stored in instruction storage unit 30 and number storage unit 15 have been then cleared, the hierarchy control system will stop operating, and the result of the calculations will be in accumulator register 12.

Having described the operation of the hierarchy control system during any single cycle of operation, the operation of the entire calculator will be considered and summarized. The calculator generally comprises an entry unit, an arithmetic unit, and a hierarchy control system. The entry unit includes keyboard 22, encoder 24, and entry register 26. The arithmetic unit includes arithmetic element 10, instruction processor 11, and accumulator register 12. The hierarchy control system includes hierarchy level detector 29L, sensing unit 29S, hierarchy control unit 33, number storage unit 15, and instruction storage unit 30.

With regard to the entry of numbers in the calculator, when a number key in keyboard 22 is actuated, a corresponding binary signal produced by encoder 24 is stored in entry register 26. Then, accumulator register 12 receives and stores the same numerical binary signal in the least significant position therein, and shifts out and thereby clears any prior number signals therein. Accumulator register 12 can hold several sequentially entered numerical digit signals. If number keys in keyboard 22 are actuated to follow the entry of other number digits, then the prior entered digit number signals in the accumulator register 12 are shifted to the next higher positions therein, and the latest entered digit number signal is stored in the least significant position of accumulator 12. Thereafter, the complete number signal, being all the consecutively entered digit number signals, are transferred together from accumulator register 12 to either number storage unit 15 or to arithmetic element 10, or from number storage unit 15 to arithmetic element 10.

With regard to the entry of a hierarchy instruction in the calculator, the actuation of a hierarchy instruction key will cause a corresponding signal to be stored in entry register 26. After the instruction signal is first processed by the hierarchy control system, it is applied to instruction processor 11. Thereupon, arithmetic element 10 will be initiated to perform the calculation on the numbers available on lines 13 and 14. The result of the calculation is then transferred by line 19 to accumulator register 12, and the numerical result is displayed by display unit 20.

When a hierarchal instruction signal is entered in entry register 26, the operation of the hierarchy control system is started by a start pulse on line 32. Hierarchy level detector 29L produces a level signal indicating that the entered hierarchal instruction is designated for either section L, N or H. Hierarchy control unit 33 receives the sensing signals via line 35 from sensing unit 29S indicating the presence of instruction signals in sections L, N, and H of instruction storage unit 30. In response thereto, hierarchy control unit 33 sequentially produces transfer out signals for those sections of instruction storage unit 30 having equal and higher priority instructions stored therein, in declining order of priority, i.e. first for section H, then for section N, and thereafter for section L. These transfer out signals will continue to be produced for the instructions stored in instruction storage unit 30 until its section having the priority order equal to that of the hierarchal instruction signal in entry register 26 is determined to be clear. Each transfer out signal produced by hierarchy control unit 33 will be applied to the corresponding sections of the instruction and number storage units 30 and 15 in order to transfer the contents thereof to be applied to the arithmetic unit. Thereupon, arithmetic element 10 will perform the calculations indicated by this instruction signal on that number transferred to it from the number storage unit 15 with that number than present in accumulator register 12. The result of the calculation is then placed back into accumulator register 12. As indicated, hiararchy control unit 33 will continue to operate in this manner until the section in instruction storage unit 30 for receiving the instruction signal stored in entry register 26 is determined to be clear, At that time, in response to the level signal on line 34 from hierarchy level detector 29L, a transfer in signal is produced on line 37 to cause the instruction signal in entry register 26 to be transferred to this priority order section, and to cause the number in accumulator register 12 to be transferred to the corresponding number storage section, Then hierarchy control unit 33 will stop and wait for the next start pulse on line 32.

In case a total or equal key is actuated, then a start pulse on line 32 will also be produced to cause the hierarchy control system to clear the contents of instruction storage unit 30 and number storage unit 15 in the same manner as above described. In case a non-hierarchal instruction signal is entered in entry register 26, then it will be applied directly to the arithmetic unit by line 17, and the hierarchy control system will remain inoperative. In that event, arithmetic element 10 will receive the number in accumulator register 12 on line 13, will carry out the non-hierarchal instruction on that number, and transfer the result of the calculation back to accumulator register 12 via line 19.

Now, the operation of the calculator with the hierarchy control system will be considered for calculating a mathematical expression wherein a series of entries are made in the calculator. This operation will be illustrated by the example of calculating the mathematical expression of $\sqrt{6^2 + 8^2} \div 5 - 1 + 4 \times 3^2$ in which all the indicated mathematical operations are involved. Reference will be made to the chart of FIG. 11 which shows the location of the number and instruction signals after each entry is made for this example.

With the calculator cleared of any prior entries, at entry no 1, the number "6" key in keyboard 22 is actuated to produce a corresponding binary signal in entry register 26 which is transferred to accumulator register 12. Similarly, during each odd number entry shown in the chart of FIG. 11, the entered number is also transferred to accumulator register, without changing the stored signals in the instruction and number sections. When a number is entered in the keyboard, the hierarchy control system does not become operative. At entry no 2, the key for the hierarchal instruction of the square root of the sum of the squares is actuated to produce in entry register 26 the instruction binary signal for this instruction such as seen in FIG. 2. The hierarchy control system will now go through a cycle of operation to transfer this instruction signal to section H of instruction storage unit 30, and to transfer the binary signal for "6" to section H' of number storage unit 15. Accumulator register 12 will be cleared and therefore reading "0." Similarly, for instruction entries numbered 4, 6, and 8, the hierarchy control system will operate to cause the prior entered mathematical instruction to be performed and place the then entered mathematical instruction signal in storage together with the resultant calculated number. In addition, for instruction entries numbered 10 and 12, the hierarchy control system will also go through a cycle of operation. However, it will be noted that for the instruction entries numbered 10 and 12, during the operation of the hierarchy control system, the instruction and number signals are stored as shown by the chart of FIG. 11, but no calculations are performed by the arithmetic unit. At entry no 14 for the total or equal entry, the hierarchy control system will go through three sequential steps indicated as 14a, 14b, and 14c to perform the calculations and make the transfers as indicated for each of these steps. Finally, the resultant number signal of "37" will be in accumulator register 12. At this time, the hierarchy control system will stop operating, and the sections of instruction storage unit 30 and number storage unit 15 will be clear of any entries.

From the above description of this calculator, it will be realized that its operation in making hierarchal mathematical calculations is compatible with its operation in making non-hierarchal mathematical calculations such as calculations involving trigonometric and hyperbolic functions. With a numerical value in accumulator register 12, actuation of a non-hierarchy instruction key in keyboard 22 may be made to apply a non-hierarchal instruction signal to instruction processor 11 of the arithmetic unit. The hierarchy control system will not become operative. Then, arithmetic element 10 will receive the numerical value in accumulator register 12 via line 13, and it will carry out the non-hierarchal instruction and transfer the result on line 19 to accumulator register 12. It will also be realized that non-hierarchal mathematical instructions can be performed by this calculator on mathematical expressions including several terms in which the hierarchal rules of mathematics should be observed. For instance, assume that the "sine" function of the mathematical expression stated in the above given example illustrated by the chart of FIG. 11 is desired. Then, the evaluation of this mathematical expression in accordance the the mathematical rules of hierarchy can be determined as already described. The result of this calculation will now be in accumulator register 12. Upon actuation of the "sine" key in keyboard 22, the sine function of this mathematical expression will now be available in accumulator register 12. Still further, this result can be subsequently utilized in additional calculations. Accordingly, the operational compatibility of this calculator further enables it to be used for calculations of mathematical expressions including combined hierarchal and non-hierarchal terms.

In the above embodiment, three hierarchal levels were considered. However, it should be understood that any number of hierarchal levels can be processed by the system of this invention. In that event, instruction storage unit 30 and number storage unit 15 will have a plurality of sections corresponding to the plurality of levels involved. The hierarchy control system will then accordingly produce transfer in and transfer out signals for each of these hierarchal levels in the same manner as described. For instance, it is customary in mathematical expressions to enclose a portion thereof in brackets or the like to indicate that the terms in this portion are to be evaluated prior to being combined with the other portions of the mathematical expression. In that event, the terms within the bracketed portion may be assigned different and higher hierarchal levels in accordance with the desired rules of priority in making this calculation.

A significant feature of this calculator with the hierarchy control system is that only a limited number of storage sections are needed to store numerical and instruction entries. Although mathematical expressions may contain many terms, the mathematical operations in these expressions are relatively few. Therefore, only a corresponding number of hierarchal levels need to be considered for the storage means in a calculator operating in accordance with this invention. Even if a mathematical expression contains an infinite series, it may be desirable to calculate many of the terms of the series in order to obtain a resultant numerical value that is as accurate as possible. For obtaining this possible accuracy, many terms of the series will be included in the calculations. The calculator herein described does not require storage means for all the entered numbers and instructions included in the calculation of mathematical expressions, but only needs storage means for all the mathematical hierarchal levels involved.

Having herein described the invention, what is claimed as new is:

1. An electronic calculator comprising:
 an entry unit for producing hierarchal instruction signals having a plurality of hierarchal levels of operation;
 an arithmetic unit for performing calculations in accordance with instruction and number signals applied thereto; and
 instruction and number signals applied thereto; and
 a hierarchy control system connected to the entry unit and to the arithmetic unit,
 said hierarchy control system including an instruction storage unit with a storage section for each hierarchal level of operation of the instruction signals, and
 said hierarchy control system including a hierarchy control unit responsive to an entered hierarchy instruction signal to sequentially transfer previously stored instruction signals from the instruction storage sections to the arithmetic unit in a predetermined order, and thereafter to transfer the entered instruction signal into a storage section for its hierarchal level of operation.

2. The calculator in accordance with claim 1 which additionally includes a number storage unit with a number storage section associated with each instruction section to operate therewith so that a number signal therein is transferred with the instruction signal to the arithmetic unit, and that a number signal in the arithmetic unit is transferred to the number section when the entered hierarchal instruction signal is transferred to the instruction section.

3. The calculator in accordance with claim 2 wherein the entry unit can produce a total signal to operate the hierarchy control system to sequentially transfer in said predetermined order the stored instruction and number signals to the arithmetic unit until cleared thereof, and wherein the entry unit can additionally produce non-hierarchy instruction signals to be directly applied to the arithmetic unit to perform calculations therewith.

4. An electronic calculator comprising:
 an entry unit for producing number signals and for producing hierarchal instruction signals having a plurality of hierarchal levels of operation;
 an arithmetic unit for performing calculations in accordance with number and instruction signals applied thereto, said arithmetic unit including an accumulator register to receive the number signals produced by the entry unit and to receive the number signals resulting from the calculations performed by the arithmetic unit; and
 a hierarchy control system connected to the entry unit and to the arithmetic unit,
 said hierarchy control system including an instruction storage unit with an instruction storage section for each hierarchal level of operation of the instruction signals, and including a number storage unit with a number storage section associated with each instruction storage section, and
 said hierarchy control system including a hierarchy control unit responsive to an entered hierarchy instruction signal to sequentially transfer in a predetermined order previously stored signals from the instruction and number storage sections to the arithmetic unit to perform calculations therewith, and thereafter to transfer the entered instruction signal and the number signal in the accumulator register to an instruction storage section for its hierarchal level of operation and to its associated number storage section, respectively.

5. The calculator in accordance with claim 4 wherein an instruction signal in an instruction section is transferred together with a number signal in an associated number section to be applied to the arithmetic unit to perform calculations therewith, and wherein the entry unit can produce a total signal to operate the hierarchy control unit to sequentially transfer all the instruction and number signals stored in the instruction and number sections in said predetermined order to the arithmetic unit.

6. The calculator in accordance with claim 5 wherein said predetermined order abides with the mathematical rules of hierarchy, and wherein the entry unit can additionally produce non-hierarchy instruction signals to be directly applied to the arithmetic unit to perform calculations with the number signal in the accumulator register.

7. An electronic calculator comprising:
 an entry unit for producing hierarchal instruction signals having a plurality of hierarchal levels of operation;
 an arithmetic unit for performing calculations in accordance with number and instruction signals applied thereto; and
 an hierarchy control system connected to the entry unit and to the arithmetic unit,
 said hierarchy control system including an instruction storage unit with an instruction storage section for each hierarchal level of operation of the instruction signals, a hierarchy level detector to produce hierarchy level signals for each hierarchal level of the instruction signals in the entry unit, and a hierarchy control unit, said hierarchy control unit being responsive to an entered hierarchal instruction signal to start operating with the instruction storage sections in a predetermined sequential order by being responsive to a. the presence of an instruction signal therein to transfer it to the arithmetic unit, b. the absence of an instruction signal therein and to the absence of a hierarchy level signal for that section to proceed to operate with another section, and c. the absence of an instruction signal and to the presence of a hierarchy level signal for the section to transfer the entered instruction signal into that section, and then to stop operating.

8. The calculator in accordance with claim 7 which additionally includes a number storage unit with a number storage section associated with each instruction section to operate therewith so that a number signal therein is transferred together with the instruction signal to the arithmetic unit, and so that a number signal in the arithmetic unit is transferred to the number section when the entered hierarchy instruction signal is transferred to the instruction section; and wherein the entry unit can produce a total signal to operate the hierarchy control unit to sequentially transfer all the instruction and number signal stored in the instruction and number sections in said predetermined order to the arithmetic unit to perform sequential calculations therewith.

9. The calculator in accordance with claim 8 wherein said predetermined order abides with the methematical rules of hierarchy, and wherein the entry unit can additionally produce non-hierarchy instruction signals to be directly applied to the arithmetic unit to immediately perform calculations with the number signal in the accumulator register.

10. An electronic calculator comprising:

an entry unit for producing number signals and for producing hierarchal instruction signals having a plurality of hierarchal levels of operation;

an arithmetic unit for performing calculations in accordance with number and instruction signals applied thereto, said arithmetic unit including an accumulator register to receive the number signals produced by the entry unit and the number signals resulting from the calculations; and a hierarchy control system connected to the entry unit and to the arithmetic unit, said hierarchy control system including an instruction storage section for each said level of operation and a number storage section associated with each instruction storage section, a hierarchy level detector responsive to said plurality of hierarchal levels of operation to produce level signals for each said hierarchal level of operation, and a hierarchy control unit responsive to an entered hierarchal instruction signal to start operating with the storage sections in a predetermined sequential order to a. transfer the instruction and number signals in the section to the arithmetic unit when an instruction signal is present, b. proceed to operate on other sections with an instruction signal and a level signal for that section are not present, and c. transfer the entered instruction signal into the instruction section together with the number signal in the accumulator register into the associated number section, when an instruction signal is absent and a hierarchal level signal for that section is present, and then to stop operating.

11. The calculator in accordance with claim 10 wherein an instruction signal in an instruction section is transferred together with a number signal in an associated number section to be applied to the arithmetic unit to perform calculations therewith, and wherein the entry unit can produce a total signal to operate the hierarchy control unit to sequentially transfer all the instruction and number signals stored in the instruction and number sections in said predetermined order to the arithmetic unit.

12. The calculator in accordance with claim 11 wherein the entry unit can additionally produce non-hierarchy instruction signals to be directly applied to the arithmetic unit to immediately perform calculations with the number signal in the accumulator register.

13. A calculator with an hierarchy control system comprising:

a keyboard having actuable keys for producing number and instruction signals in binary form;

an entry register connected to the keyboard to receive instruction signals having hierarchal levels of operation;

an arithmetic unit with an arithmetic element to perform calculations;

an accumulator register connected to the entry register to receive its produced number signals and connected to the arithmetic element to receive its calculated number signals;

an instruction storage unit having a plurality of instruction sections connected to the entry register and to the arithmetic unit, each instruction section thereof being actuable either to receive from the entry register an instruction signal of a designated hierarchal level of operation or to transfer an instruction signal therein to the arithmetic unit;

a number storage unit with a plurality of number sections connected to the accumulator register and to the arithmetic unit, each number section being actuable upon the actuation of a corresponding instruction section either to receive a number signal from the accumulator register or to transfer a number signal therein to the arithmetic unit; and an hierarchal control unit connected to the instruction and number storage units and being responsive to the entry of the instruction signal in the entry register to actuate the instruction and number sections in order to successively transfer in hierarchal order its contents of equal and higher hierarchal order to the arithmetic unit to perform calculations therewith, and then to transfer the contents of the entry register and the accumulator register to their respective instruction and number sections.

14. The calculator in accordance with claim 13 wherein an instruction signal in an instruction section is transferred together with a number signal in an associated number section to be applied to the arithmetic unit to perform calculations therewith, and wherein the keyboard can produce a total signal to operate the hierarchy control unit to sequentially transfer all the instruction and number signals stored in the instruction and number sections in said predetermined order to the arithmetic unit.

15. The calculator in accordance with claim 14 wherein the keyboard can additionally produce non-hierarchy instruction signals to be directly applied to the arithmetic unit to immediately perform calculations with the number signal in the accumulator register.

16. A calculator with a hierarchy control system comprising:

a keyboard having actuable keys for producing number and instruction signals in binary form;

an entry register connected to the keyboard to receive the instruction signals produced by the keyboard;

an arithmetic unit having an accumulator register connected to the entry register to receive the number signals produced by the keyboard and to receive the calculated number signals produced by the arithmetic unit;

an instruction storage unit having a plurality of actuable instruction sections connected to the entry register and to the arithmetic unit, each instruction section being operable to receive an instruction signal of a designated hierarchal level;

a number storage unit with a plurality of actuable number sections connected to the accumulator register and to the arithmetic unit, each number section thereof being operable with a corresponding instruction section ;and a hierarchy control unit connected to the instruction and number storage units and being responsive to the entry of an instruction signal in the entry register to successively transfer the contents of said hierarchy control unit which are of equal and higher hierarchal order to the arithmetic unit for execution thereof, said transfers occurring successively in hierarchal order starting with the highest level instruction and ending with the instruction with a level equal to that in the entry register, each number section also being actuated with each corresponding instruction section to transfer a number signal therein to the arithmetic unit to operate thereon together with the number signal in the accumulator register, and thereafter to transfer the contents of the entry register and the accumulator register to their respective instruction and number sections.

17. The calculator in accordance with claim 16 wherein an instruction signal in an instruction section is transferred together with a number signal in an associated number section to be applied to the arithmetic unit to perform calculations therewith, and wherein the keyboard can produce a total signal to operate the hierarchy control unit to sequentially transfer all the instruction and number signals stored in the instruction and number sections in said predetermined order to the arithmetic unit.

18. The calculator in accordance with claim 17 wherein the keyboard can additionally produce non-hierarchy instruction signals to be directly applied to the arithmetic unit to immediately perform calculations with the number signal in the accumulator register.

19. An electronic calculator comprising:

an entry unit for producing number signals and for producing hierarchal instruction signals having a plurality of hierarchal levels of operation;

an arithmetic unit for performing calculations in accordance with number and instruction signals applied thereto, and including an accumulator register to receive the number signals from the entry unit and to receive the number signals resulting from the calculations performed by the arithmetic unit;

a hierarchy level detector connected to the entry unit to produce a hierarchy level signal for each hierarchal level of the instruction signals produced therein;

storage means connected to the entry unit and to the arithmetic unit, said storage means having an instruction storage section for each hierarchal level of operation, and having a number storage section associated with each instruction section, sensing means connected to the instruction storage sections to sense the presence of an instruction signal in each section thereof; and a hierarchy control unit connected to the hierarchy level detector, sensing means and storage means, and being responsive to an entered hierarchal instruction signal to start operating to sequentially transfer the contents of the storage means in a predetermined order to the arithmetic unit to perform calculations therewith, then to transfer the entered instruction signal and the number signal in the accumulator register to their sections, and then to stop operating.

20. The calculator in accordance with claim 19 wherein an instruction signal in an instruction section is transferred together with a number signal in its associated number section to be applied to the arithmetic unit to perform calculations therewith; wherein the entry unit can produce a total signal to operate the hierarchy control unit to sequentially transfer all the instruction and number signals stored in the instruction and number sections in said predetermined order to the arithmetic unit; wherein said predetermined order abides with the mathematical rules of hierarchy; and wherein the entry unit can additionally produce non-hierarchy instruction signals to be directly applied to the arithmetic unit to perform calculations with the number signal in the accumulator register.

* * * * *

UNITED STATES PATENT OFFICE
CERTIFICATE OF CORRECTION

Patent No. 3,720,820 Dated March 13, 1973

Inventor(s) MICHAEL J. COCHRAN

It is certified that error appears in the above-identified patent and that said Letters Patent are hereby corrected as shown below:

On the cover sheet [73], "Tektranex" should read -- Tektronix -- . Column 15, cancel line 30. Column 17, line 8, after "signal for", change "the" to -- that -- . Column 17, line 63, "with" should read -- when -- .

Signed and sealed this 22nd day of January 1974.

(SEAL)
Attest:

EDWARD M. FLETCHER, JR.
Attesting Officer

RENE D. TEGTMEYER
Acting Commissioner of Patents